(12) United States Patent
Jacob

(10) Patent No.: US 6,306,045 B1
(45) Date of Patent: Oct. 23, 2001

(54) ASSEMBLY HAVING A CONSTANT VELOCITY FIXED JOINT AND A CONNECTING SHAFT

(75) Inventor: Werner Jacob, Frankfurt (DE)

(73) Assignee: GKN Lobro GmbH (DE)

( * ) Notice: Subject to any disclaimer, the term of this patent is extended or adjusted under 35 U.S.C. 154(b) by 0 days.

(21) Appl. No.: 09/522,386

(22) Filed: Mar. 10, 2000

(30) Foreign Application Priority Data

Mar. 12, 1999 (DE) .............................................. 199 11 111

(51) Int. Cl.[7] ........................................................ F16D 3/06
(52) U.S. Cl. ................................................. 464/167; 464/906
(58) Field of Search ..................................... 464/162, 167, 464/168, 906, 904, 905; 29/898.061

(56) References Cited

U.S. PATENT DOCUMENTS

| 1,022,909 | * | 4/1912 | Whitney ........................... 464/167 X |
| 2,239,192 | * | 4/1941 | Cutting ............................... 464/162 |
| 4,205,925 | * | 6/1980 | Fisher ................................. 464/906 |
| 5,624,318 |   | 4/1997 | Jacob et al. . |
| 5,779,551 |   | 7/1998 | Stall et al. . |
| 6,234,908 | * | 5/2001 | Jacob ................................. 464/140 |

FOREIGN PATENT DOCUMENTS

| 1.373.752 | * | 8/1964 | (FR) ...................................... 464/167 |
| 2 116 672-A | * | 9/1983 | (GB) ...................................... 464/906 |
| 2 311 117 A |   | 9/1997 | (GB) . |
| 2 332 499 A |   | 6/1999 | (GB) . |

OTHER PUBLICATIONS

Löhr & Bromkamp GmbH—De 296 16 432.1—Sep., 1996.

* cited by examiner

Primary Examiner—Lynne H. Browne
Assistant Examiner—Greg Binda

(57) ABSTRACT

The invention relates to an assembly having a first constant velocity fixed joint 1 which comprises an inner part 5 with an attaching bore 8. The inner part 5 is connected to a plunging journal 15 associated with a plunging unit of a connecting shaft 3. To achieve adaptability to different installation conditions, the plunging journal 15, in its outer face, is provided with first grooves 16 which extend over the entire length of same and thus also serve to establish a rotationally fast connection with the inner part 5. The length 19 of the plunging journal 15, which projects beyond the inner part 5 is greater than the rolling adjustment path 15 which results from the adjustment of the plunging sleeve portion 11 relative to the plunging journal 15 when the rolling contact members 21 roll in the first grooves 16 and in the second grooves 14 between the stops 23, 24.

9 Claims, 2 Drawing Sheets

ASSEMBLY HAVING A CONSTANT VELOCITY FIXED JOINT AND A CONNECTING SHAFT

BACKGROUND OF THE INVENTION

The invention relates to an assembly having a first constant velocity fixed joint comprising an inner part which is provided with an attaching bore and which is connected to a connecting shaft comprising a plunging unit.

DE 296 16 432 U1 describes a constant velocity driveshaft with two constant velocity fixed joints and a connecting shaft. The connecting shaft comprises a first tubular portion whose one end is provided with an externally toothed portion which engages a correspondingly toothed bore of the inner part of one of the two constant velocity fixed joints. The tubular portion is connected to a sleeve portion of a plunging unit by means of toothing. The plunging sleeve contains a plunging journal which, with the assistance of balls acting as rolling contact members, is rollingly plungeable. The balls are held by a cage. The balls are guided in grooves in the outer face of the plunging journal and in grooves in the bore of the plunging sleeve. At one end, the plunging journal comprises a toothed portion by means of which it is held in a rotationally fast way in a correspondingly toothed bore of the inner part of the further constant velocity fixed joint. The plunging journal is axially held by a securing ring in the attaching bore of the inner part. For connecting purposes, it is usual to select pointed toothings. Such constant velocity driveshafts are preferably used for driving the wheels of a motor vehicle, especially of a passenger car and are arranged, for example, between the axle drive and the wheels. Different vehicle models have different attaching lengths for the constant velocity driveshafts. Furthermore, the tolerances result in differences in installation lengths.

It is an object of the invention to provide an assembly which comprises a first constant velocity fixed joint and a connecting shaft and which is suitable for compensating for installation length tolerances which occur during installation.

SUMMARY OF THE INVENTION

In accordance with one embodiment of the present invention, the foregoing and other objects are achieved by providing an assembly including a first constant velocity fixed joint comprising an inner part which is provided with an attaching bore. The assembly also includes a connecting shaft which is provided with a plunging unit comprising a longitudinal axis. The plunging unit is provided with a plunging journal whose outer face is provided with circumferentially distributed first grooves which extend parallel to the longitudinal axis over the entire length of the plunging journal. The plunging unit, furthermore, is provided with a plunging sleeve portion which comprises a bore which is centered on the longitudinal axis and in which there are arranged second grooves which extend parallel to the longitudinal axis, so that one first and one second groove are arranged opposite one another. The plunging unit further includes rolling contact members which are rollingly received in the first and second grooves and which are held by a cage. In addition, the plunging journal, by means of part of its length provided with first grooves, is received in the attaching bore of the inner part in a rotationally fast way. Furthermore, the plunging journal length projecting from the inner part and comprising first grooves is dimensioned so as to be longer than the adjustment path resulting from a rolling adjustment in the plunging sleeve portion.

For the normal operating range of such an embodiment, the necessary change in length resulting from the articulation of the constant velocity fixed joint is always available as a rolling plunge; whereas for tolerance and length compensating purposes in the case of the different installation conditions, the remaining path can be used slidingly. For shortening purposes, for example, it is possible to move the plunging sleeve as far as the inner part of the first constant velocity fixed joint and stop thereagainst. In consequence, in the case of extreme plunging distances which occur, for example, when the vehicle is lifted for repair purposes and the wheels rebound completely, a displacement in the sense of the rolling members sliding in the first running grooves of the plunging journal is possible in that it constitutes an additional path. In such a situation, practically no torque is transmitted and the adjustment path wherein the rolling adjustment between the plunging sleeve portion and the plunging journal takes place can, accordingly, be limited to the normal operating conditions.

In addition, the possibility of additional shortening can be utilized when mounting a constant velocity driveshaft in a motor vehicle, which driveshaft contains such an assembly. Furthermore, the embodiment as selected permits a cost-effective solution because the plunging journal is provided with continuous first running grooves which are also used for providing a rotationally fast connection with the inner part, the advantage of such an embodiment being that, as compared to the standard pointed toothing, there is provided a connection which permits closer tolerances to be observed and thus achieves easier assembly conditions.

According to a further embodiment of the invention, the attaching bore is provided with projections which engage at least part of the number of first grooves and which firmly connect the inner part and the plunging journal to one another in the direction of rotation. In such an embodiment, the number of projections preferably corresponds to the number of first grooves, with the projections being rib-shaped.

Furthermore, the plunging sleeve portion can be connected to a tubular portion, with the two parts preferably being produced as to be integral with one another. The plunging journal, too, can be tubular in shape.

For providing a constant velocity shaft, the connecting shaft end removed from the plunging journal is connected to a second constant velocity fixed joint.

Other objects and advantages of the invention will become apparent from reading the following detailed description and appended claims, and upon reference to the accompanying drawings.

BRIEF DESCRIPTION OF THE DRAWINGS

For a more complete understanding of the invention, reference should now be made to the embodiments illustrated in greater detail in the accompanying drawings and described below by way of examples of the invention. In the drawings.

DETAILED DESCRIPTION OF THE PREFERRED EMBODIMENTS

Figure 1:
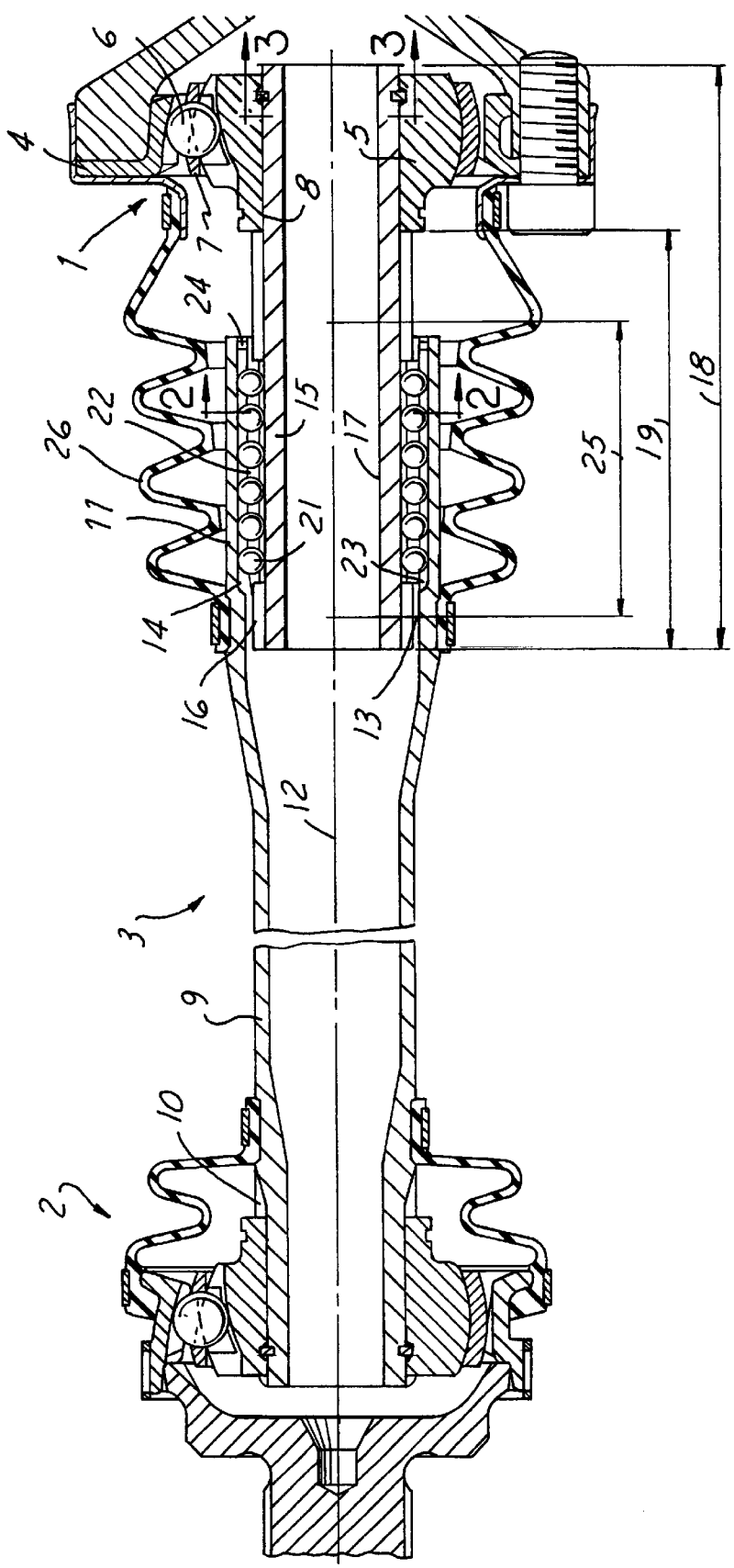
FIG. 1 is a longitudinal section through a constant velocity driveshaft which comprises an assembly in accordance with the invention.

FIG. 1 shows a constant velocity driveshaft with a first constant velocity fixed joint 1 at one end, a second constant velocity fixed joint 2 at the other end and a connecting shaft 3 connecting said two joints. The connecting shaft 3 comprises the longitudinal axis 12. The two constant velocity fixed joints 1, 2 correspond to one another in respect of design in principle, but they differ in respect of the connections. The first constant velocity fixed joint 1 is provided with a flange connection, whereas the second constant velocity fixed joint 2 comprises a journal connection. Below, only the first constant velocity fixed joint 1 will be briefly explained.

The first constant velocity fixed joint 1 comprises the outer part 4, the inner part 5, a cage 7 arranged between the outer part 4 and the inner part 5, and balls 6 which engage outer running grooves and inner running grooves of the outer part 4 and of the inner part 5 respectively for torque transmitting purposes. When the outer part 4 is articulated relative to the inner part 5, the balls 6 are guided by the cage 7 and by the shape of the outer running grooves and inner running grooves receiving the balls 6, into the homokinetic plane. Furthermore, the inner part 5 comprises an attaching bore 8 which is connected to one end of the connecting shaft 3. The connecting shaft 3 comprises a tubular portion 9 which, at one end, is provided with a toothed portion 10 which serves to engage a toothed bore in the inner part of the second constant velocity fixed joint 2.

Figure 2:
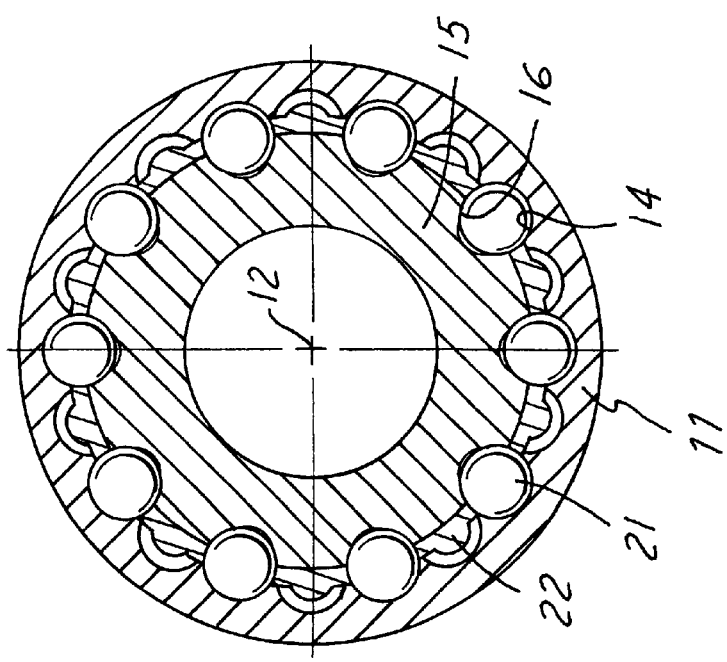
FIG. 2 is a section view along line II—II according to FIG. 1.

A plunging sleeve portion 11 is integrally connected to the tubular portion 9 and comprises a bore 13 in which there are arranged a plurality of second grooves 14 which, as can be seen in FIG. 2, are circumferentially distributed around the longitudinal axis 12 and which extend parallel to the longitudinal axis 12. Towards the tubular portion 9, the second grooves 14 end in the first stop 23. Towards the open end facing away from the tubular portion 9, there is inserted a securing ring which serves as the second stop 24. In each second groove 14, there are received several balls 21 arranged one behind the other and rollingly moving along the longitudinal axis 12 between the two stops 23, 24. The balls 21 are held at a distance from one another in a cage 22. On its outer face, a plunging journal 15 is provided with circumferentially distributed first grooves 16 which extend parallel to the longitudinal axis 12, with the number of first grooves 16 corresponding to part of the number of second grooves 14 which are occupied by balls 21. The plunging journal 15 comprises a central through-bore 17.

In the case of the embodiment shown—and particularly with reference to FIG. 2—each second groove 14 of the plunging sleeve portion 11 is provided with balls 21, so that in the plunging journal 15, there is provided only a number of first grooves 16 which corresponds to half the number of second grooves 14. The first grooves 16 extend over the entire length 18 of the plunging journal 15, i.e., also over that part which is received in the attaching bore 8 of the inner part 5. The toothing can also be designed to match the design of the plunging journal 15. The length with the first running grooves 16 projecting from the inner part 5 has been given the reference number 19. The adjustment path 25 results from the rolling path of the rolling contact members 21 which is obtained from the length of the second grooves 14 between the two stops 23, 24. The adjustment path 25 is dimensioned in such a way that it is smaller than the projecting length 19, so that beyond the rolling adjustment (adjustment path 25) of the plunging sleeve portion 11 on the plunging journal 15, a sliding adjustment can take place between the two parts.

Figure 3:
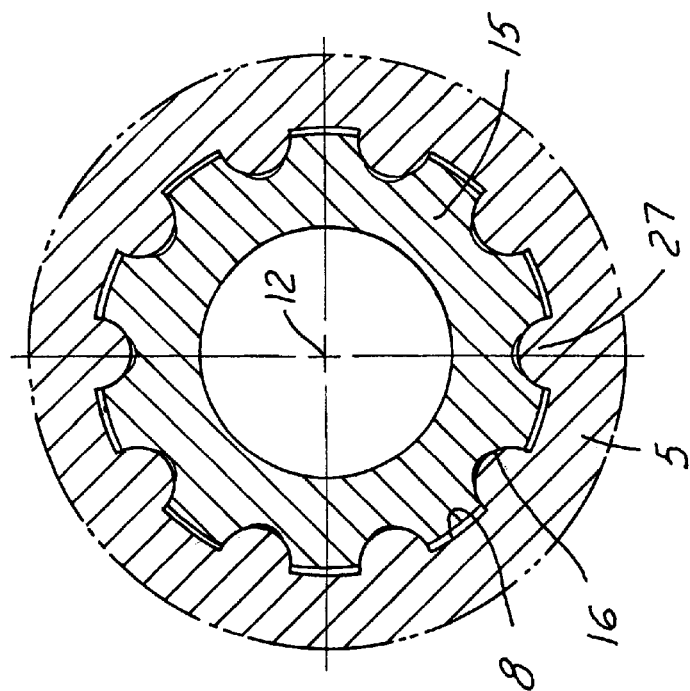
FIG. 3 is a section view along line III—III according to FIG. 1.

As shown in FIG. 3, the attaching bore 8 of the inner part 5 is provided with rib-shaped projections 27 which are circumferentially distributed in accordance with the first grooves 16 of the plunging journal 15. The projections 27 engage the first grooves 16 and, in addition, serve to center the plunging journal 15 relative to the inner part 5.

Furthermore, there is provided a convoluted boot 26 which closes the free space between the outer part 4 and the plunging sleeve portion 11 of the connecting shaft 3. The convoluted boot 26 permits articulation between the connecting shaft 3 and the outer part 4 and also a change in the position of the connecting shaft 3 and the outer part 4 relative to one another towards the longitudinal axis 12. For example, for assembling a constant velocity driveshaft, the first constant velocity fixed joint 1 can be moved towards the plunging sleeve portion 11 until the latter comes into contact with the inner part 5 of the first constant velocity fixed joint 1.

From the foregoing, it can be seen that there has been brought to the art a new and improved constant velocity joint assembly. While the invention has been described in connection with one or more embodiments, it should be understood that the invention is not limited to those embodiments. On the contrary, the invention covers all alternatives, modifications, and equivalents as may be included in the spirit and scope of the appended claims.

What is claimed is:

1. An assembly comprising:
   a first constant velocity fixed joint (1) comprising an inner part (5) which is provided with an attaching bore (8); and
   a connecting shaft (3) including a plunging unit having a longitudinal axis (12) said plunging unit comprising:
      a plunging journal (15) whose outer face is provided with circumferentially distributed first grooves (16) which extend parallel to the longitudinal axis (12) over the entire length (18) of the plunging journal (15);
      a plunging sleeve portion (11) which comprises a bore (13) which is centered on the longitudinal axis (12) and in which there are arranged second grooves (14) which extend parallel to the longitudinal axis (12), so that one first and one second groove (14, 16) are arranged opposite one another; and
      rolling contact members (21) which are rollingly received in the first and second grooves (14, 16) and which are held by a cage (22),
      wherein, the plunging journal (15), by way of part of its length (18) provided with first grooves (16), is received in the attaching bore (8) of the inner part (5) in a rotationally fast way and wherein a length (19) projecting from the inner part (5) and comprising first grooves (16) is dimensioned so as to be longer than an adjustment path 25 resulting from a rolling adjustment in the Plunging sleeve portion (11).

2. An assembly according to claim 1, wherein the attaching bore (8) is provided with projections (27) which engage at least part of the 4 number of first grooves (16) and which firmly connect the inner part (5) and the plunging journal (15) to one another in the direction of rotation.

3. An assembly according to claim 1, wherein the plunging sleeve portion (11) is connected to a tubular portion (9).

4. An assembly according to claim 3, wherein the plunging sleeve portion (11) and the tubular portion (9) are produced so as to be integral with one another.

5. An assembly according to claim 4, wherein the plunging journal (15) is tubular in shape.

6. An assembly according to claim 5, wherein the connecting shaft end removed from the plunging journal (15) is connected to a second constant velocity fixed joint (2).

7. An assembly according to claim 1, wherein the plunging journal (15) is tubular in shape.

8. An assembly according to claim 7, wherein the connecting shaft end removed from the plunging journal (15) is connected to a second constant velocity fixed joint (2).

9. An assembly according to claim 1, wherein the connecting shaft end removed from the plunging journal (15) is connected to a second constant velocity fixed joint (2).

* * * * *